United States Patent
Matich et al.

(10) Patent No.: US 10,975,950 B2
(45) Date of Patent: Apr. 13, 2021

(54) GEARING, MOTOR-GEARING COMBINATION AND SHAFT-GEARING COMBINATION

(71) Applicant: Wittenstein SE, Igersheim (DE)

(72) Inventors: Sebastian Matich, Bad Mergentheim (DE); Philipp Guth, Stuttgart (DE); Jan Wettlaufer, Würzburg (DE)

(73) Assignee: Wittenstein SE, Igersheim (DE)

( * ) Notice: Subject to any disclaimer, the term of this patent is extended or adjusted under 35 U.S.C. 154(b) by 0 days.

(21) Appl. No.: 16/364,331

(22) Filed: Mar. 26, 2019

(65) Prior Publication Data

US 2019/0293167 A1    Sep. 26, 2019

(30) Foreign Application Priority Data

Mar. 26, 2018 (DE) .................. 102018107150.7

(51) Int. Cl.
*F16H 3/00*       (2006.01)
*F16H 57/023*     (2012.01)
*F16H 3/093*      (2006.01)

(52) U.S. Cl.
CPC .......... *F16H 57/023* (2013.01); *F16H 3/006* (2013.01); *F16H 3/093* (2013.01); *F16H 2003/0931* (2013.01)

(58) Field of Classification Search
CPC ........ F16H 3/006; F16H 3/093; F16H 57/023; F16H 2003/0931
USPC ........................................................ 475/5
See application file for complete search history.

(56) References Cited

U.S. PATENT DOCUMENTS

| 7,765,867 B2 * | 8/2010 | Schaffer ................ G01F 23/284 73/292 |
| 8,876,657 B1 * | 11/2014 | Behbehani ............. B62M 25/08 477/20 |
| 9,828,109 B2 * | 11/2017 | Mitrovic ................. B64C 11/44 |
| 2016/0229549 A1 | 8/2016 | Mitrovic et al. |

FOREIGN PATENT DOCUMENTS

| DE | 102006056682 A1 | 7/2007 |
| DE | 102008000644 A1 | 9/2009 |
| DE | 102007042659 C5 | 1/2016 |
| EP | 2201584 A1 | 6/2010 |
| EP | 2933655 A1 | 10/2015 |
| WO | 2008107168 A2 | 9/2008 |

OTHER PUBLICATIONS

Wikipedia, "Gear Train", https://en.wikipedia.org/wiki/Gear_train, pp. 1-10.

* cited by examiner

*Primary Examiner* — Leslie A Nicholson, III
(74) *Attorney, Agent, or Firm* — Bachman & LaPointe, PC

(57) ABSTRACT

Gearing for a motor-gearing combination with a gearing output shaft, having: a drive interface; an output interface on the gearing output shaft; a transmission device configured for wireless bidirectional data transmission between the drive interface and the output interface and configured for wireless energy transmission from the drive interface to the output interface.

12 Claims, 4 Drawing Sheets

GEARING, MOTOR-GEARING COMBINATION AND SHAFT-GEARING COMBINATION

FIELD OF THE INVENTION

The disclosure relates to a gearing, to a motor-gearing combination, and to a shaft-gearing combination.

PRIOR ART

EP 2 201 584 A1 discloses inductive coupling elements for contactless energy transmission and capacitive coupling elements for transmission of data. In the case of the conventional technology, energy and data are transmitted from a static part to a part of a motor.

DISCLOSURE OF THE INVENTION

It is an object of the invention to specify a more comprehensive, more flexible or improved transmission of energy or data in a drivetrain.

The object is achieved, in terms of the gearing, by means of the features disclosed herein. In terms of the motor-gearing combination, the object is achieved by means of the features disclosed herein. In terms of the shaft-gearing combination, the object is achieved by means of the features disclosed herein.

According to one aspect, a gearing is specified. The gearing is designed for a motor-gearing combination which comprises a gearing output shaft. The gearing comprises a drive interface, an output interface on the gearing output shaft, and a transmission device. The transmission device is configured for wireless bidirectional data transmission between the drive interface and the output interface, and the transmission device is configured for wireless energy transmission from the drive interface to the output interface.

The aspects, features and embodiments described herein are all applicable to a motor-gearing combination.

According to a further aspect, a motor-gearing combination is specified which comprises a gearing described herein. The motor-gearing combination furthermore comprises a motor and an interface coupling device. The motor is configured for driving the drive side of the gearing, and the motor comprises a motor interface, wherein the motor interface is positionally fixed relative to the drive interface of the gearing. The interface coupling device is configured for wirelessly coupling the drive interface of the gearing to the motor interface.

According to a further aspect, a shaft-gearing combination is specified. The shaft-gearing combination comprises a planetary gearing having an output interface, a motor shaft inserted into the gearing, and a transmission device. The transmission device is configured for wireless bidirectional data transmission from the motor shaft to the output interface, and the transmission device is configured for wireless energy transmission from the motor shaft to the output interface.

Drive and output, where used herein, relate to the corresponding parts of the gearing. Typically, the drive of the gearing has an input torque applied thereto by a motor, for example a servomotor, the gearing serves for torque conversion, and an output torque is provided at the output of the gearing, for example for a mechanical consumer. The drive interface is provided on the drive side of the gearing, for example on a housing of the gearing or on an input shaft of the gearing. The output interface is provided on the output side or the output shaft of the gearing.

An output gearing shaft, where used herein, comprises an output shaft for torque transmission, on which for example a pinion may be welded or clamped, or an output flange for torque transmission, for example with end-side fastening elements such as for example threaded bores.

A drive interface, where used herein, has for example one or more electrical contacts or is of contactless, for example inductive, capacitive or optical design. The drive interface is typically connectable to an electrical energy source. In embodiments, a contact provided for the energy transmission and a contact provided for the data transmission are provided as one and the same contact.

An output interface, where used herein, has for example one or more electrical contacts or is of contactless, for example inductive, capacitive or optical design. The output interface is typically connectable to an electrical consumer on the output side. In embodiments, a contact provided for the energy transmission and a contact provided for the data transmission are provided as one and the same contact.

In embodiments, the output interface is formed as an electrical contact arrangement assigned to the gearing output shaft. Assigned to the gearing output shaft encompasses for example the contact arrangement being fastened to or integrated in the gearing output shaft. The contact arrangement typically comprises a plug or a socket or a flexible connecting device with electrical contacts. A flexible connecting device is for example a cable with the electrical contacts, which cable is led out of the gearing output shaft. Alternatively, the output interface is formed as a flat coil assigned to the gearing output shaft. The flat coil is for example integrated into the gearing output shaft, and is typically integrated into an output flange.

An interface, where used herein, however does not imply a logical or spatial relationship such as for example a structural unit. For example, a contact provided for the energy transmission is structurally or spatially separate from a contact provided for the data transmission.

In embodiments, the gearing furthermore has a consumer arranged at the output side. The electrical consumer is connected, for the supply of electrical energy, to the output interface. The electrical consumer is furthermore connected, for the transmission and/or receipt of data, to the output interface. The consumer on the output side can be supplied with electrical energy from the energy source. Typically, no dedicated electrical energy source for the continuous operation of the electrical consumer is provided on the output side.

The electrical consumer on the output side typically interacts with the mechanical consumer in terms of measurement technology. In embodiments, the electrical consumer on the output side is of exchangeable, in particular modular form.

Examples for a consumer on the output side include, but are not restricted to, a sensor, a sensor-actuator system, a processor, a locally distributed sensor node and/or a locally distributed processor node; a specific, non-limiting example for a consumer on the output side with a sensor and a processor are for example an inertial measurement unit (IMU) or multiple inductive proximity sensors with an electrically actuated clamping device for holding a workpiece.

A consumer on the output side is typically designed so as to transmit data, for example sensor data or measurement data, via the output interface to the drive interface, and is designed so as to receive data, for example control commands that are input into the drive interface, from the output interface.

In embodiments, the transmission device that is configured for wireless bidirectional data transmission has a multiplex functionality for a bidirectional communication function of data between the drive interface and the output interface. For example, the transmission device has a time multiplex functionality.

In embodiments, the gearing is in the form of a coaxial or angular gearing. Examples of a coaxial gearing include a planetary gearing or a disk cam gearing.

A planetary gearing typically comprises an internal gear, a sun gear and multiple planet gears. The planet gears are mounted on a planet gear carrier. In one example, in which the sun gear is driven and the output shaft is arranged on the planet gear carrier, the sun gear is assigned to the drive side and the planet gear carrier is assigned to the output side. The drive interface is provided on the drive side. The output interface is provided on the output side. The energy transmission takes place from the drive side (from the side of the sun gear) to the output side (to the side of the output interface). The data transmission takes place from the drive side (from the side of the sun gear) to the output side (to the side of the output interface) and/or in the opposite direction.

A disk cam gearing is constructed for example as described in WO 2008/107168 A2; the position relationships described with regard to the planetary gearing apply correspondingly in the case of the disk cam gearing, wherein the driven disk cam would correspond to the sun gear and the tooth carrier of the disk cam gearing would correspond to the planet carrier.

The transmission device is for example configured for inductive energy transmission. In embodiments, the transmission device comprises a multiplicity of inductive transmission units assigned to one another, typically coils such as for example flat coils, disks or hollow cylinders. In embodiments, the inductive transmission units are configured for inductive data transmission. The inductive transmission units are typically configured such that they can transmit electrical energy from the drive side to the output side, and configured such that they can transmit data from the drive side to the output side and from the output side to the drive side.

The transmission is not restricted to inductive transmission. In embodiments, at least one of energy transmission and bidirectional data transmission takes place by optical or capacitive means. In the case of an optical energy transmission or an optical bidirectional data transmission, it is typically the case that in each case one pair of light-emitting element and light-receiving element is provided for the respective transmission direction. Examples for a light-emitting element include a light-emitting diode, a semiconductor laser and the like. Examples for a light-receiving element include a photodiode, a phototransistor and the like.

In embodiments, the wireless data transmission and the wireless energy transmission are configured with different transmission methods. Transmission methods are selected for example from a group including inductive transmission, capacitive transmission, ultrasound transmission and optical transmission.

The transmission device is typically adapted in terms of its transmission power, both with regard to energy and data, to the requirements of sensors or more complex sensor-actuator systems. Here, the ratio of the maximum mechanical power that can be transmitted by the gearing to the output-side maximum electrical power consumption is, in typical embodiments, between 50:1 and 10,000:1. In the case of the gearings used in the secondary axes of modern machine tools, the power that can be transmitted by the gearing lies between 100 watts and 20 kW. The electrical transmission power of a gearing of said type would then typically lie between 0.1 watt and 20 watts, in particular between 1 watt and 10 watts.

In embodiments, the energy transmission is configured for output-side electrical power consumption of at least 0.1 watt or at most 100 watts. Optionally, the energy transmission is configured for output-side electrical power consumption of at least 1 watt and at most 10 watts. Output-side electrical power consumption is power required by an electrical consumer provided on the output side for the operation thereof. Output-side electrical power consumption of a particular magnitude is possible if at least one corresponding electrical line is provided on the output interface.

In embodiments, the ratio of the maximum mechanical power that can be transmitted by the gearing to the output-side maximum electrical power consumption lies between 50:1 and 10,000:1.

In embodiments, the transmission device comprises a multiplicity of transmission units, wherein transmission units of the transmission device which are assigned to one another are in each case variable in terms of position relative to one another. Transmission units which are assigned to one another typically provide, between them, the respective wireless transmission functionality for energy and/or data. For example, inductive transmission units, which are assigned to one another, for energy transmission and/or for data transmission are magnetically coupled to one another.

Variable in terms of position, where used herein, encompasses a relative movement of the transmission units assigned to one another. A relative movement also includes, for example, a relative rotational movement. If, for example, inductive transmission units which are assigned to one another are in the form of a pair of flat coils, a relative movement includes a relative rotational movement about an axis of one of the flat coils or about a common axis of the two flat coils.

Typically, transmission units which are assigned to one another are arranged within the gearing in each case at the transition points or gaps between the individual gearing components. In embodiments, multiple transmission units are interconnected, so as to form a conductive path, via electrically conductive connections.

In embodiments, between at least one transmission unit, typically at an electrically conductive connection of a conductive path of transmission units, there is provided a pickoff for energy and data. At the pickoff, energy and/or data can be fed in or conducted out. Typically, an energy pickoff has an AC/DC converter or a DC/AC converter, an alternating-current voltage is converted into a direct-current voltage, and the direct-current voltage serves for the supply of energy to consumers. Typically, a data pickoff has a transceiver, for example a transceiver of a field bus system.

In embodiments, the transmission device comprises a multiplicity of transmission units, wherein transmission units of the transmission device which are assigned to one another are in each case variable in terms of position relative to one another, and wherein a first of the transmission units of the transmission device is formed so as to be fixed with respect to a housing, and a second of the transmission units of the transmission device is arranged on a planet carrier of a planet stage of the transmission or on a tooth carrier of the gearing.

In embodiments, the planetary gearing is formed as an at least two-stage planetary gearing, wherein the transmission device comprises further interacting transmission units which are arranged on the two planet carriers of the two-stage planetary gearing. The further interacting transmission units of the transmission device are configured in a series circuit in relation to the interacting transmission units above.

In embodiments, at least one of the transmission units, in particular one of the inductive or optical transmission units, is configured for detecting and transmitting a gearing-related rotational angle. Alternatively or in addition, in embodiments, at least one of the transmission units is configured for detecting and transmitting a gearing-related spacing. Alternatively or in addition, in embodiments, at least one of the transmission units is configured for detecting and transmitting a transmission-related rotational speed. Alternatively or in addition, in embodiments, at least one of the transmission units is configured for detecting and transmitting a gearing-related oil level and/or a gearing-related oil condition. Oil condition, where used herein, encompasses for example a concentration or distribution of foreign bodies in the gearing oil, such as for example ferromagnetic particles.

A transmission unit, for example a flat coil, which is configured for detecting and transmitting a gearing-related rotational angle or gearing-related spacing detects the respective variable typically without a further sensor arrangement, for example by monitoring the profile with respect to time of a field variable in accordance with the resolver principle. Typically, the windings of a flat coil configured for detecting and transmitting a gearing-related rotational angle run in meandering fashion.

A transmission unit, for example a flat coil, which is configured for detecting and transmitting a gearing-related rotational speed and/or a gearing-related oil level and/or a gearing-related oil condition comprises the respective variable typically without a further sensor arrangement, for example by monitoring a variable related to a conversion of kinetic energy from the relative rotational movement into electrical energy in accordance with the generator principle.

In embodiments, at least one of the transmission units for energy transmission is configured to be independent of a further transmission unit. The transmission unit configured to be independent of a further transmission unit is for example not assigned to any other transmission unit, though may be assigned to a suitable other transmission unit if required. The suitable other transmission unit is for example provided on an electrical consumer on the output side.

Typically, in embodiments, energy harvesting can be implemented by means of at least one of the transmission units. In this way, energy can be additionally provided even for example to rotating parts.

The features, aspects and embodiments described herein can contribute to providing a gearing with a secondary function, for transmitting electrical energy and for transmitting data, in addition to its primary torque conversion function. The primary torque conversion function is not significantly influenced by the transmission device, the drive interface and the output interface. Likewise, an external geometry, in particular external contour in the axial direction of the gearing, is not influenced by the transmission device.

The possibility of transmitting energy and data is provided in the gearing such that, for this function, there is no imperative need for further system components with a space requirement.

It is possible for the energy transmission and the data transmission to be ensured over the entire gearing path between the drive side of the gearing and the output side of the gearing. It is furthermore possible for these functions to be provided not only internally within the gearing but also, via the gearing output, at an external consumer.

BRIEF DESCRIPTION OF THE DRAWINGS

Further advantages and features of preferred embodiments of the invention will be discussed below on the basis of the appended drawings, wherein, in the figures.

DESCRIPTION OF EMBODIMENTS

Typical embodiments will be described below on the basis of the figures, wherein the invention is not restricted to the exemplary embodiments, with the scope of the invention rather being determined by the claims.

Figure 1:
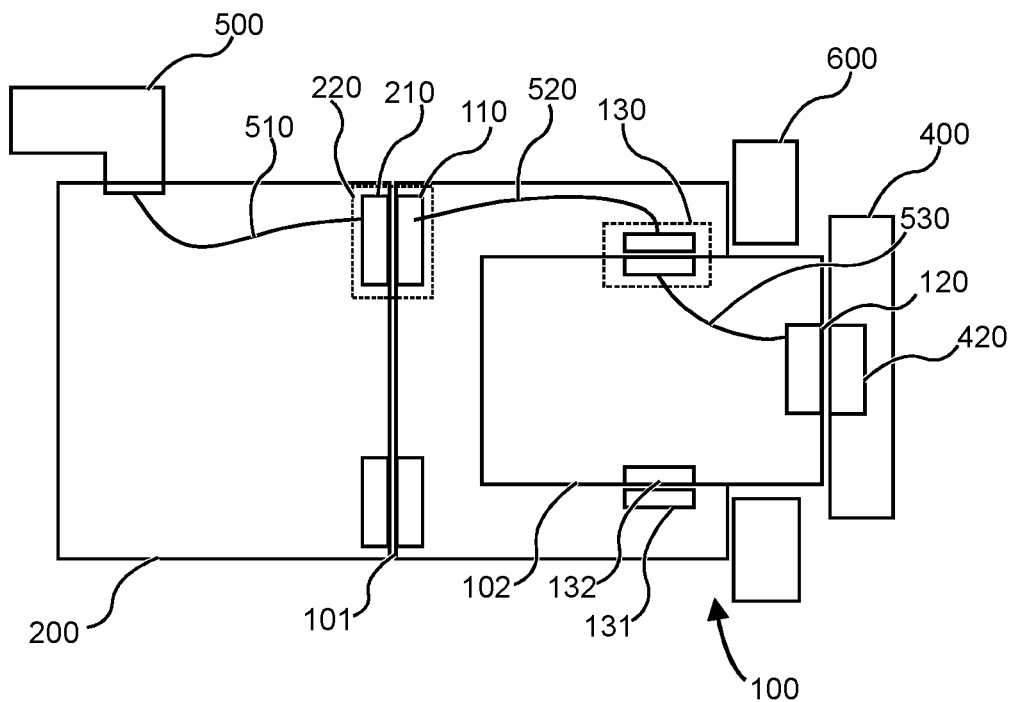
FIG. 1 shows a schematic sectional view of an embodiment of a gearing.

FIG. 1 shows a schematic sectional view of an embodiment of a gearing 100 in a motor-gearing combination. A motor 200, for example a servo motor, is mechanically coupled (not illustrated) to a drive side 101 of the gearing 100 and is designed such that the motor 200 can transmit a torque to the drive side 101 of the gearing 100. The gearing 100 is for example a coaxial gearing, for example a planetary gearing, a disk can gearing or an angular gearing, for example a bevel-wheel gearing or the like. The gearing 101 is designed so as to convert a torque input on the drive side 101 and provide a corresponding output torque on an output side of the gearing. The embodiment illustrated in FIG. 1 shows a single-stage gearing 100, for example planetary gearing, with the drive side at a gearing drive shaft 101 and the output side on a gearing output shaft 102. A gearing output shaft 102, as used herein, also encompasses a gearing output flange.

A drive interface 110 is provided on the drive side 101 of the gearing 100. The drive interface 110 in FIG. 1 is formed as an inductive interface, for example flat coil, but is not limited to this. On the output side, in this case on the output shaft 102 of the gearing, there is provided an output interface 120. The output interface 120 in FIG. 1 is in the form of an inductive interface, for example flat coil, but is not limited to this.

The gearing 100 has a transmission device 130, which provides wireless bidirectional data transmission between the drive interface 110 and the output interface 120 and wireless energy transmission between the drive interface 110 and the output interface 120. The transmission device 130 has a first transmission unit 131 on the side of the drive 101 of the gearing 100 and a second transmission unit 132 on the side of the output shaft 102 of the output of the gearing 100. The transmission device 130 is, in FIG. 1, an inductive transmission device 130 with a first cylinder coil 131 and a second cylinder coil 132, but is not limited to this. During operation, the second transmission unit 132 rotates relative to the first transmission unit 131.

The housing 10 (See FIG. 2) of the gearing 100 is fixed to an assembly flange 600. A consumer 400 is mechanically coupled to the gearing output shaft 102 on the side of the output of the gearing. In the embodiment as per FIG. 1, the consumer 400 has a mechanical function and electrical function. The electrical function of the consumer 400 provides, for example, sensor functions, actuator functions or the like. The output interface 120 is, in FIG. 1, inductively coupled to a consumer interface 420 of the consumer 400. By means of the coupling between output interface 120 and consumer interface 420, the electrical function of the consumer 400 is supplied with energy. By means of the coupling between output interface 120 and consumer interface 420, the consumer 400 furthermore receives data, for example control commands for the actuator functions, and/or the consumer makes data available via the coupling between consumer interface 420 and output interface 120, for example sensor functions.

On the side of the motor 200, there is provided a terminal device 500 with a terminal (not illustrated) for the electrical energy supply and a terminal for the input and/or output of data. A line connection 510 connects the terminal device 500 to a motor interface 210. The motor interface 210 is for example, but is not limited to, an inductive interface 210. The motor interface 210 is coupled, for example inductively, to the drive interface 110 of the gearing 100. The inductive coupling provides, for example, an interface coupling device 220 for the wireless coupling. By means of the coupling between motor interface 210 and drive interface 110, the transmission device 130 is provided with energy, which is transmitted to the output interface 120 and ultimately supplies the electrical function of the consumer 400 with energy. Also, by means of the coupling between motor interface 210 and drive interface 110, the data transmission with the consumer 400 takes place via the transmission device 130 and the output interface 120. A line connection 520 connects the drive interface 110 to the first transmission unit 131 of the transmission device 130. A line connection 530 connects the second transmission unit 132 of the transmission device 130 to the output interface 120.

Figure 2:
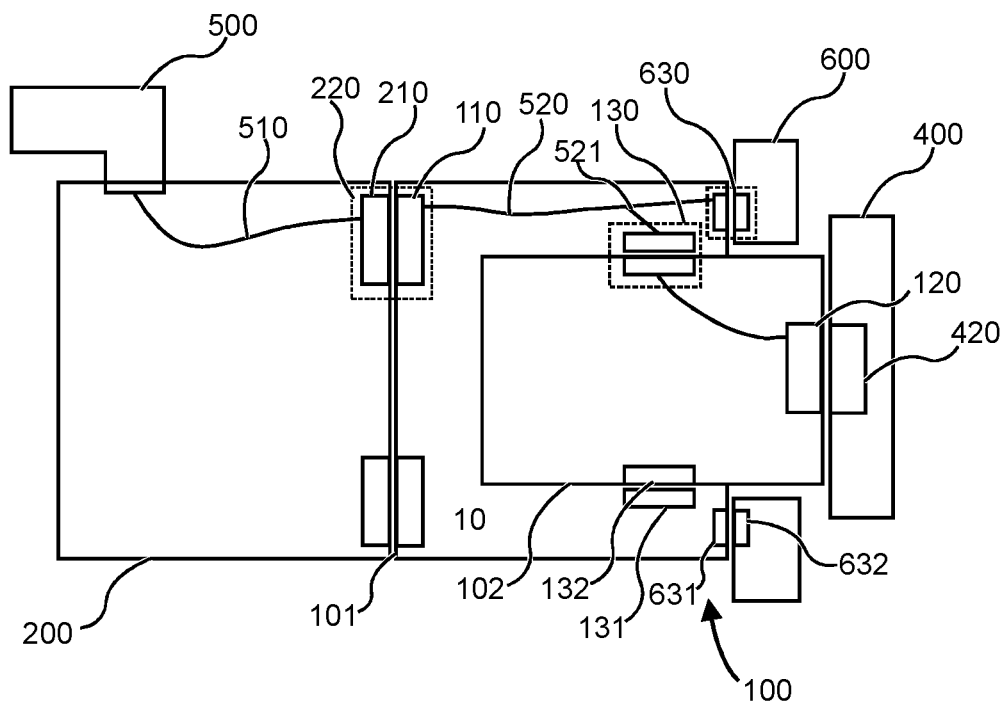
FIG. 2 shows a schematic sectional view of a further embodiment of a gearing.

FIG. 2 shows a schematic sectional view of an embodiment of a gearing 100 in a motor-gearing combination similar to FIG. 1. In the embodiment as per FIG. 2, an assembly flange transmission device 630 is furthermore provided, for transmitting energy and/or data between assembly flange 600 and gearing 100. The assembly flange transmission device 630 comprises a first transmission unit 631 and a second transmission unit 632. In FIG. 2, the first transmission unit 631 and the second transmission unit 632 are again in the form of inductive transmitters, but are not limited to these.

In FIG. 2, at the line connection 520 which connects the drive interface 110 to the first transmission unit 131 of the transmission device 130, there is provided a branch line 521, which connects the drive interface 110 to the first transmission unit 631 of the assembly flange transmission device. The remaining features are as described in FIG. 1, to which reference is expressly made. The description thereof will therefore not be repeated here.

Figure 3:
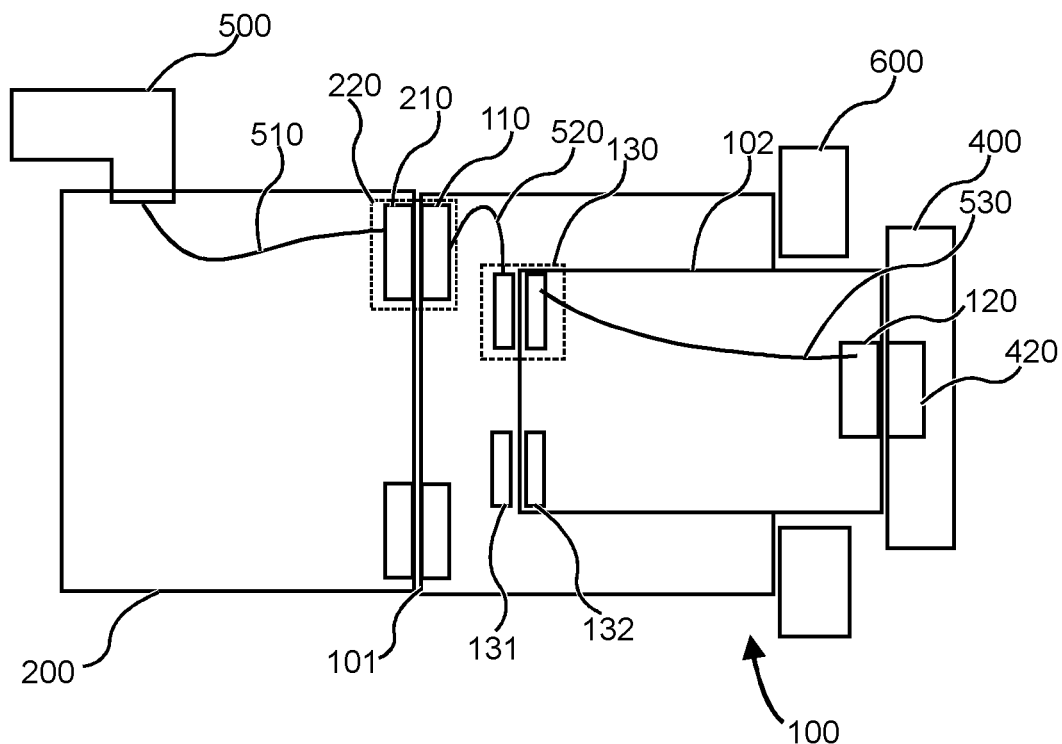
FIG. 3 shows a schematic sectional view of a further embodiment of a gearing.

FIG. 3 shows a schematic sectional view of an embodiment of a gearing 100 in a motor-gearing combination similar to FIG. 1. In the embodiment as per FIG. 3, the transmission device 130 has flat coils rather than cylinder coils. The first transmission unit 131 of the transmission device 130 is formed as a flat coil, and the second transmission unit 132 of the transmission device 130 is formed as a flat coil. The remaining features are as described in FIG. 1, to which reference is expressly made. The description thereof will therefore not be repeated here.

Figure 4:
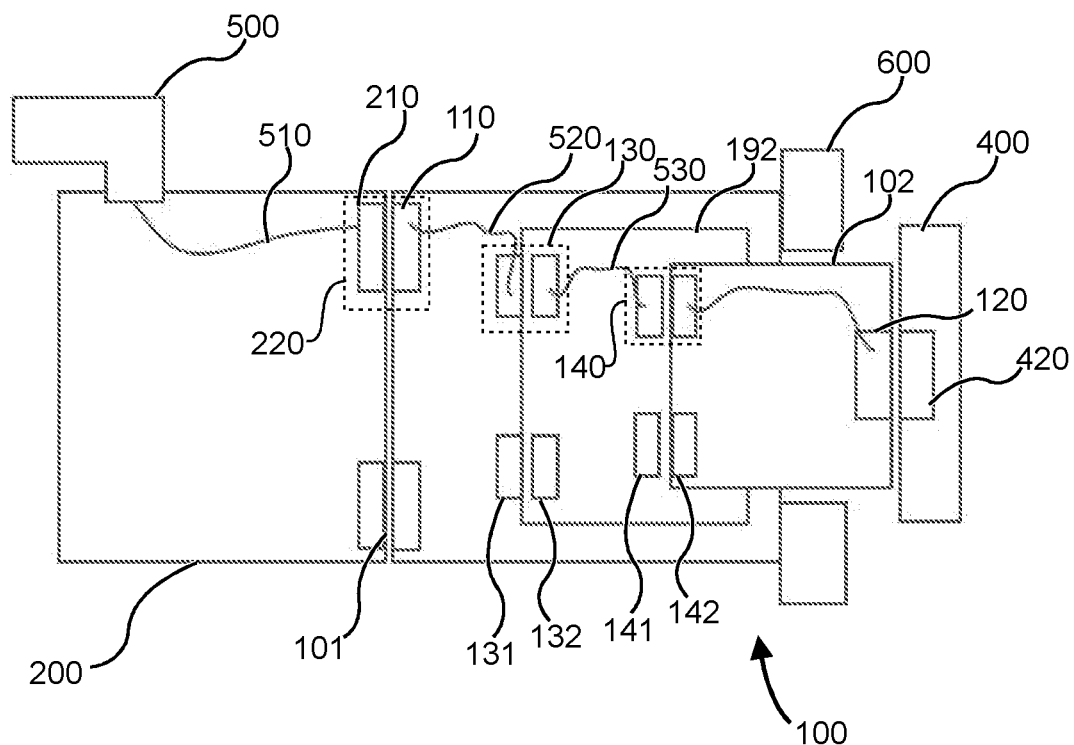
FIG. 4 shows a schematic sectional view of a further embodiment of a gearing.

FIG. 4 shows a schematic sectional view of an embodiment of a gearing 100 in a motor-gearing combination similar to FIG. 1. The gearing 100 in the embodiment as per FIG. 4 is in the form of a two-stage gearing. A transmission of torque from the drive side 101 to the output side is realized via a gearing intermediate stage 192 in a two-stage gearing. The transmission device 130 comprises a first transmission unit 131 on the drive side and a second transmission unit 132, coupled wirelessly to the first transmission unit 131, on the side of the gearing intermediate stage 192. The transmission device furthermore comprises a third transmission unit 141 on the side of the gearing intermediate stage 192 and a fourth transmission unit 142, coupled wirelessly to the third transmission unit 141, on the planet carrier, connected to the output shaft 102, of the second stage.

During operation, the first transmission unit 131 performs a rotational movement relative to the second transmission unit 132 with a first rotational speed, and the third transmission unit 141 performs a rotational movement relative to the fourth transmission unit 142 with a second rotational speed which differs from the first rotational speed. The second transmission unit 132 and the third transmission unit 141 are positionally fixed relative to one another and are connected to one another by means of a line connection 530.

The remaining features are as described in FIG. 1, to which reference is expressly made. The description thereof will therefore not be repeated here.

In typical embodiments, two transmission units, in particular two transmission devices, are positionally fixed relative to one another and are connected to one another by means of a line connection, but are arranged on a part of the gearing that rotates during operation, for example a planet carrier of an intermediate stage.

Figure 5:
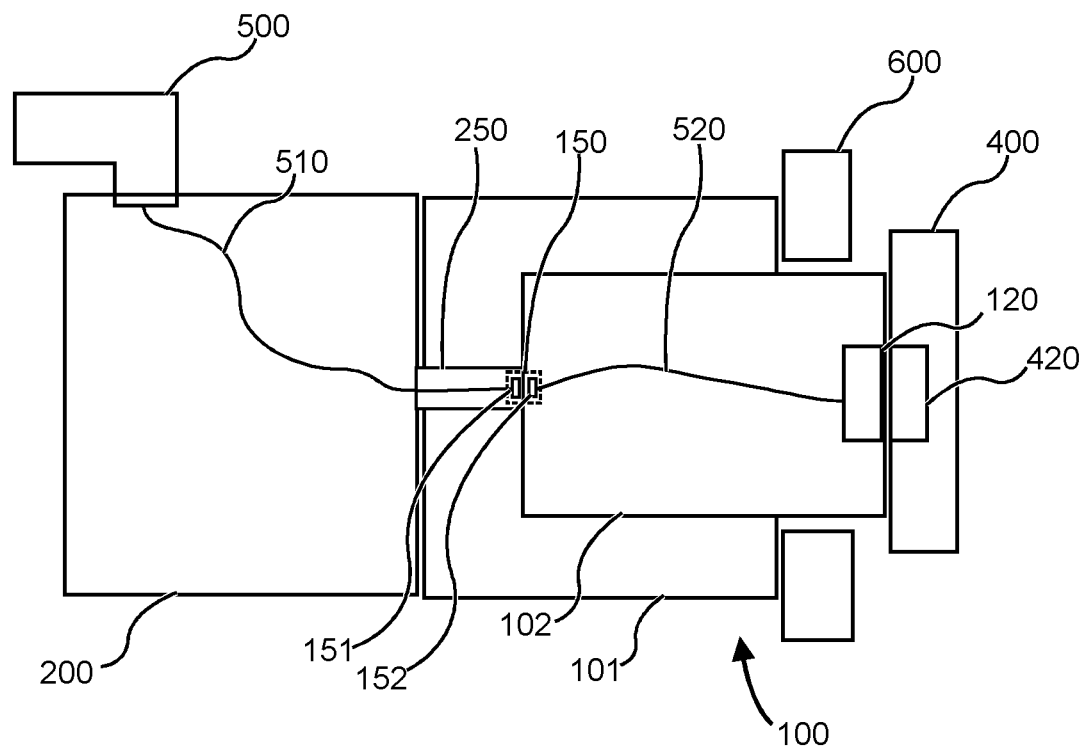
FIG. 5 shows a schematic sectional view of a further embodiment of a gearing.

FIG. 5 shows a schematic sectional view of an embodiment of a gearing 100 in a shaft-gearing combination. A motor shaft 250 from a motor 200 is inserted into the gearing 100 on the drive side 101. A transmission device 150 has a first transmission unit 151 in or on the motor shaft 250 and a second transmission unit 152 on or in the output side 102 of the gearing. The transmission device 150 is configured for wireless bidirectional data transmission from the motor shaft 250 (from the first transmission unit 151 on or in the motor shaft via the second transmission unit 152) to an output interface 102, and is configured for wireless energy transmission from the motor shaft 250 (from the first transmission unit 151 on or in the motor shaft via the second transmission unit 152) to the output interface 102. The transmission units 151, 152 are, in FIG. 5, again in the form of inductive transmission units 151, 152 or electrical contacts (not illustrated), but are not restricted to these. The remaining features are as described in FIG. 1, to which reference is expressly made. The description thereof will therefore not be repeated here.

Figure 6:
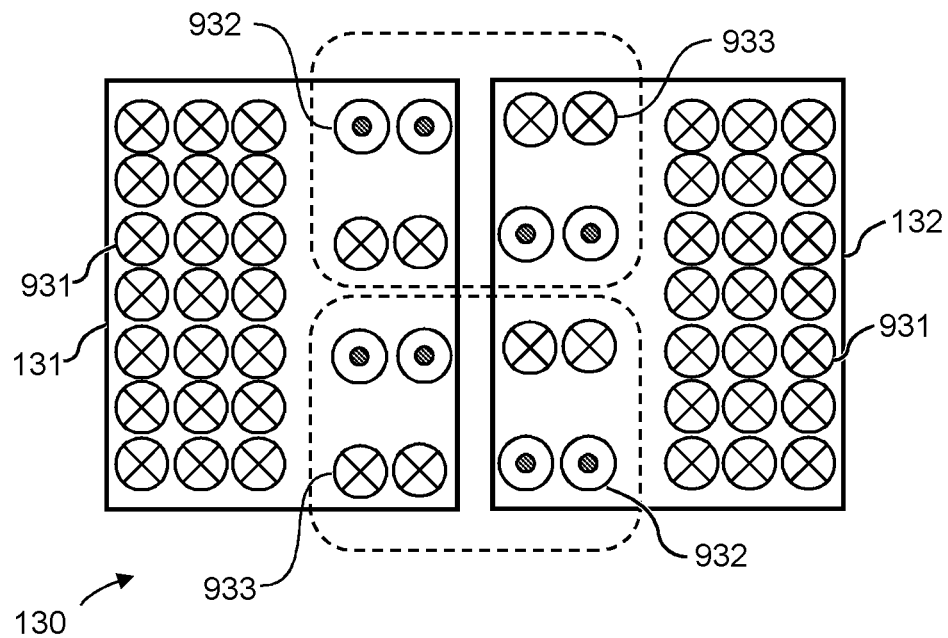
FIG. 6 shows a schematic construction of a transmission unit that can be used on a gearing according to embodiments described herein.

FIG. 6 shows, by way of example, a schematic construction of a transmission device in a sectional view, in particular an inductive transmission device, which can be used on the gearing 100 and which, in FIG. 6, is denoted overall by 130.

In FIG. 6, the coil windings are illustrated in each case using circles, wherein the technical current direction in the coil windings whose circle is labeled with a cross is opposite to the technical current direction in the coil windings whose circle is labeled with a dot.

The transmission device 130 comprises two transmission units 131 and 132 in the form of flat coils. Each of the transmission units 131 and 132 comprises an energy transmission coil 931, a data-transmitting coil 932 and a data-receiving coil 933.

Figure 7:
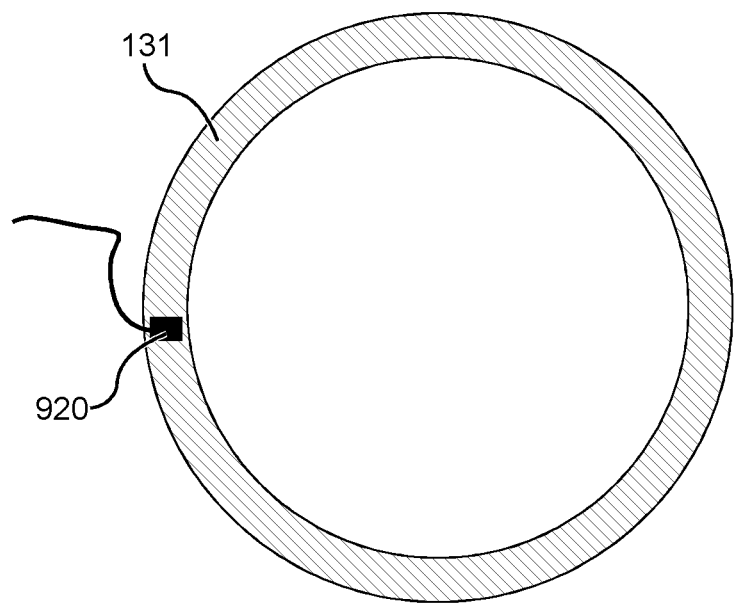
FIG. 7 shows a schematic side view of the transmission unit from FIG. 6.

FIG. 7 illustrates the transmission unit 131 from FIG. 6 in a schematic plan view. The transmission unit 131 has a ring shape, or is in the form of a flat coil. A contact region 920 is provided, and has in each case one contact in each case for the connection to the transmission coil 931, to the data-transmitting coil 932 and to the data-receiving coil 933. The transmission unit 131 illustrated by way of example permits, in a simple manner, a unidirectional transmission of energy and a bidirectional transmission of data.

The invention claimed is:

1. Gearing for a motor-gearing combination with a gearing output shaft, having:
    a drive interface;
    an output interface on the gearing output shaft;
    a transmission device,
        configured for wireless bidirectional data transmission between the drive interface and the output interface and configured for wireless energy transmission from the drive interface to the output interface, wherein the transmission device comprises a multiplicity of transmission units, wherein transmission units of the transmission device which are assigned to one another are in each case variable in terms of position relative to one another.

2. Gearing according to claim 1, wherein the gearing is in the form of an angular gearing or coaxial gearing, in particular as a planetary gearing or as a disk cam gearing.

3. Gearing according to claim 1, wherein the transmission device is configured for inductive energy transmission.

4. Gearing according to claim 1, wherein the output interface is in the form of an electrical contact arrangement, typically plug or socket, assigned to the gearing output shaft, or as a flat coil assigned to the gearing output shaft.

5. Gearing according to claim 1, wherein the energy transmission is configured for output-side electrical power consumption of at least 0.1 watt or at most 100 watts.

6. Gearing according to claim 1, wherein the transmission device is configured such that the wireless data transmission and the wireless energy transmission are configured with different transmission methods.

7. Gearing according to claim 1, wherein a first of the transmission units of the transmission device is formed so as to be fixed with respect to a housing, and the second of the transmission units of the transmission device is arranged on a planet carrier of a planet stage of the gearing or on a tooth carrier of the gearing.

8. Gearing according to claim 7, which is in the form of an at least two-stage planetary gearing, wherein the transmission device comprises further interacting transmission units which are arranged on the two planet carriers of the two-stage planetary gearing.

9. Gearing according to claim 1, wherein at least one of the transmission units is configured for detecting and transmitting at least one of a gearing-related rotational angle, a gearing-related spacing, a gearing-related rotational speed, a gearing-related oil level and a gearing-related oil condition.

10. Gearing according to claim 1, wherein at least one of the transmission units is configured for transmitting energy independently of a further transmission unit.

11. Gearing according to claim 1, furthermore having an electrical consumer, wherein the electrical consumer is arranged at an output side of the gearing, and wherein the electrical consumer is connected, for the supply of electrical energy and for the transmission and/or receipt of data, to the output interface.

12. Motor-gearing combination, comprising:
    a gearing for a motor-gearing combination with a gearing output shaft, having:
        a drive interface;
        an output interface on the gearing output shaft;
        a transmission device,
            configured for wireless bidirectional data transmission between the drive interface and the output interface;
            and configured for wireless energy transmission from the drive interface to the output interface;
    a motor configured for driving the drive side of the gearing, having a motor interface, wherein the motor interface is positionally fixed relative to the drive interface of the gearing;
    an interface coupling device configured for coupling, in particular wirelessly coupling, the drive interface of the gearing to the motor interface.

* * * * *